United States Patent
Arslan et al.

(10) Patent No.: US 11,580,317 B2
(45) Date of Patent: Feb. 14, 2023

(54) TRACKING RFID GROUPS WITH SPATIO-TEMPORAL PROXIMITY

(71) Applicant: NEC Laboratories America, Inc., Princeton, NJ (US)

(72) Inventors: Mustafa Arslan, Princeton, NJ (US); Mohammad Khojastepour, Lawrenceville, NJ (US); Shasha Li, Mereno Valley, CA (US); Sampath Rangarajan, Bridgewater, NJ (US)

(73) Assignee: NEC Corporation

(*) Notice: Subject to any disclaimer, the term of this patent is extended or adjusted under 35 U.S.C. 154(b) by 377 days.

(21) Appl. No.: 16/817,115

(22) Filed: Mar. 12, 2020

(65) Prior Publication Data
US 2020/0293729 A1 Sep. 17, 2020

Related U.S. Application Data

(60) Provisional application No. 62/877,410, filed on Jul. 23, 2019, provisional application No. 62/819,519, filed on Mar. 16, 2019.

(51) Int. Cl.
*G06K 7/10* (2006.01)
*G06N 3/04* (2006.01)

(52) U.S. Cl.
CPC ....... *G06K 7/10297* (2013.01); *G06N 3/0454* (2013.01)

(58) Field of Classification Search
CPC ............. G06K 7/10297; G06K 9/6256; G06N 3/0454; G06Q 10/0833; G06Q 20/203; G06Q 20/208

USPC ......................................... 370/252; 455/456.1
See application file for complete search history.

(56) References Cited

U.S. PATENT DOCUMENTS

| | | | |
|---|---|---|---|
| 2019/0122196 A1* | 4/2019 | Lauria | G06Q 20/203 |
| 2019/0333245 A1* | 10/2019 | Zhao | G06K 9/6256 |
| 2020/0279145 A1* | 9/2020 | Parshin | G06Q 10/0833 |

OTHER PUBLICATIONS

Shuai Xiao, Joint Modeling of Event Sequence and Time Series with Attentional Twin Recurrent Neural Networks, 2017 (Year: 2017).*
Wang et al., "RF-IDraw: Virtual Touch Screen in the Air Using RF Signals", SIGCOMM'14, Aug. 2014, 12 pages.
Shangguan et al., "ShopMiner: Mining Customer Shopping Behavior in Physical Clothing Stores with COTS RFID Devices", SenSys'15, Nov. 2015, pp. 113-126.

* cited by examiner

*Primary Examiner* — Harun Chowdhury
(74) *Attorney, Agent, or Firm* — Joseph Kolodka

(57) ABSTRACT

Systems and methods for determining radio-frequency identification (RFID) tag proximity groups are provided. The method includes receiving RFID tag readings from multiple RFID tags. The method includes determining signal strengths of the RFID tag readings. The method includes determining pairs of RFID tags based on the RFID tag readings. The method also includes implementing a twin recurrent neural network (RNN) to determine proximity groups of RFID tags based on distance similarity over time between each of the pairs of the RFID tags.

18 Claims, 7 Drawing Sheets

TRACKING RFID GROUPS WITH SPATIO-TEMPORAL PROXIMITY

RELATED APPLICATION INFORMATION

This application claims priority to U.S. Provisional Patent Application No. 62/819,519, filed on Mar. 16, 2019, and U.S. Provisional Patent Application No. 62/877,410, filed on Jul. 23, 2019, incorporated herein by reference herein in their entireties.

BACKGROUND

Technical Field

The present invention relates to radio-frequency identification (RFID) and more particularly to detection of RFID tags.

Description of the Related Art

Passive RFID tags are getting cheaper and are readily available in a variety of configurations, sizes, read ranges, memory amounts, etc. for the price of a few cents per tag. RFID tags are seeing adoption in retail stores for taking inventory and processing transactions in point-of sale (POS) systems. Stores are leveraging RFIDs in their daily operations and some governments have embarked on initiatives to deploy RFID based check-out in the next few years. The use of RFID tags for theft prevention has already been in place, where expensive goods or small items that can be hidden or misplaced easily are tagged and RFID readers (placed at entrance/exit doors) alert the retailer if an item leaves the store without being already paid for.

SUMMARY

According to an aspect of the present principles, a method is provided for determining radio-frequency identification (RFID) tag proximity groups. The method includes receiving RFID tag readings from multiple RFID tags. The method includes determining signal strengths of the RFID tag readings. The method includes determining pairs of RFID tags based on the RFID tag readings. The method also includes implementing a twin recurrent neural network (RNN) to determine proximity groups of RFID tags based on distance similarity over time between each of the pairs of the RFID tags.

According to another aspect of the present principles, a system is provided for determining radio-frequency identification (RFID) tag proximity groups. The method includes receiving RFID tag readings from multiple RFID tags. The method includes determining signal strengths of the RFID tag readings. The method includes determining pairs of RFID tags based on the RFID tag readings. The method also includes implementing a twin recurrent neural network (RNN) to determine proximity groups of RFID tags based on distance similarity over time between each of the pairs of the RFID tags.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
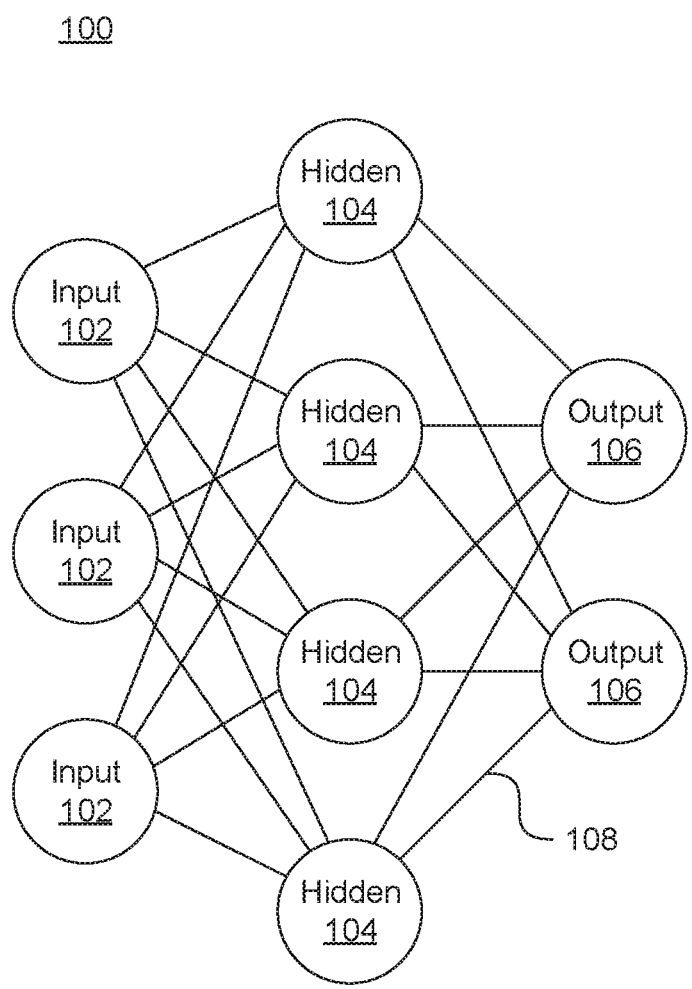
FIG. 1 is a generalized diagram of a neural network, in accordance with an embodiment of the present invention.

In accordance with the present principles, systems and methods are provided to/for employing a recurrent neural network (RNN) with attention mechanisms, to capture the spatio-temporal relationships between tag readings of radio-frequency identification (RFID) tags and determine proximity grouping in noisy settings, without explicitly localizing tags. Since retail stores contain both stationary (e.g., products on shelves) and mobile tags (e.g., products carried by shoppers), the example embodiments can be implemented to track not only mobile groups but also flexibly identify stationary tag groups. The example embodiments can be implemented using readily available tag data from commercial off-the-shelf RFID equipment.

In one embodiment, the systems and methods provide insights about customers' interactions with products based on RFID systems. The example embodiments identify groups of RFID tags that stay in close proximity (for example, within a predetermined distance) to each other over time. For example, the example embodiments can provide a framework that uses deep learning to automatically track the "virtual shopping cart" of each customer, containing the group of items carried during the shopping journey. By doing so, the example embodiments unearth hidden purchase behaviors helping retailers make better business decisions. Moreover, the example embodiments can be used in the implementation of innovative shopping experiences such as seamless checkout.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a generalized diagram of a neural network that can implement grouping of RFID tags based on spatio-temporal proximity is shown, according to an example embodiment.

An artificial neural network (ANN) is an information processing system that is inspired by biological nervous systems, such as the brain. The key element of ANNs is the structure of the information processing system, which includes many highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network generally has input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, maxout network, perceptron, etc. Finally, a set of output neurons 106 accepts and processes weighted input from the last set of hidden neurons 104. ANNs with forward connections between many sequential layers are known as deep neural networks.

This represents a "feed-forward" computation, where information propagates from input neurons 102 to the output neurons 106. The training data can include readings from RFID tags and/or proximity grouping information. The example embodiments of the ANN can be used to implement a twin recurrent neural network (RNN) (referred to as the model) with a large set of input pairs and their ground-truth labels. After training, the system uses the model to test the similarity between a pair of tags (one being a reference tag) in order to form groups as described herein below with respect to FIGS. 4 and 5.

Upon completion of a feed-forward computation, the output is compared to a desired output available from training data. The error relative to the training data is then processed in "feed-back" computation, where the hidden neurons 104 and input neurons 102 receive information regarding the error propagating backward from the output] neurons 106. Once the backward error propagation has been completed, weight updates are performed, with the weighted connections 108 being updated to account for the received error. Repeating this forward computation and backward error propagation procedure with different inputs provides one way to implement a training procedure to train the weights of the ANN. FIG. 1 represents just one variety of ANN.

Figure 2:
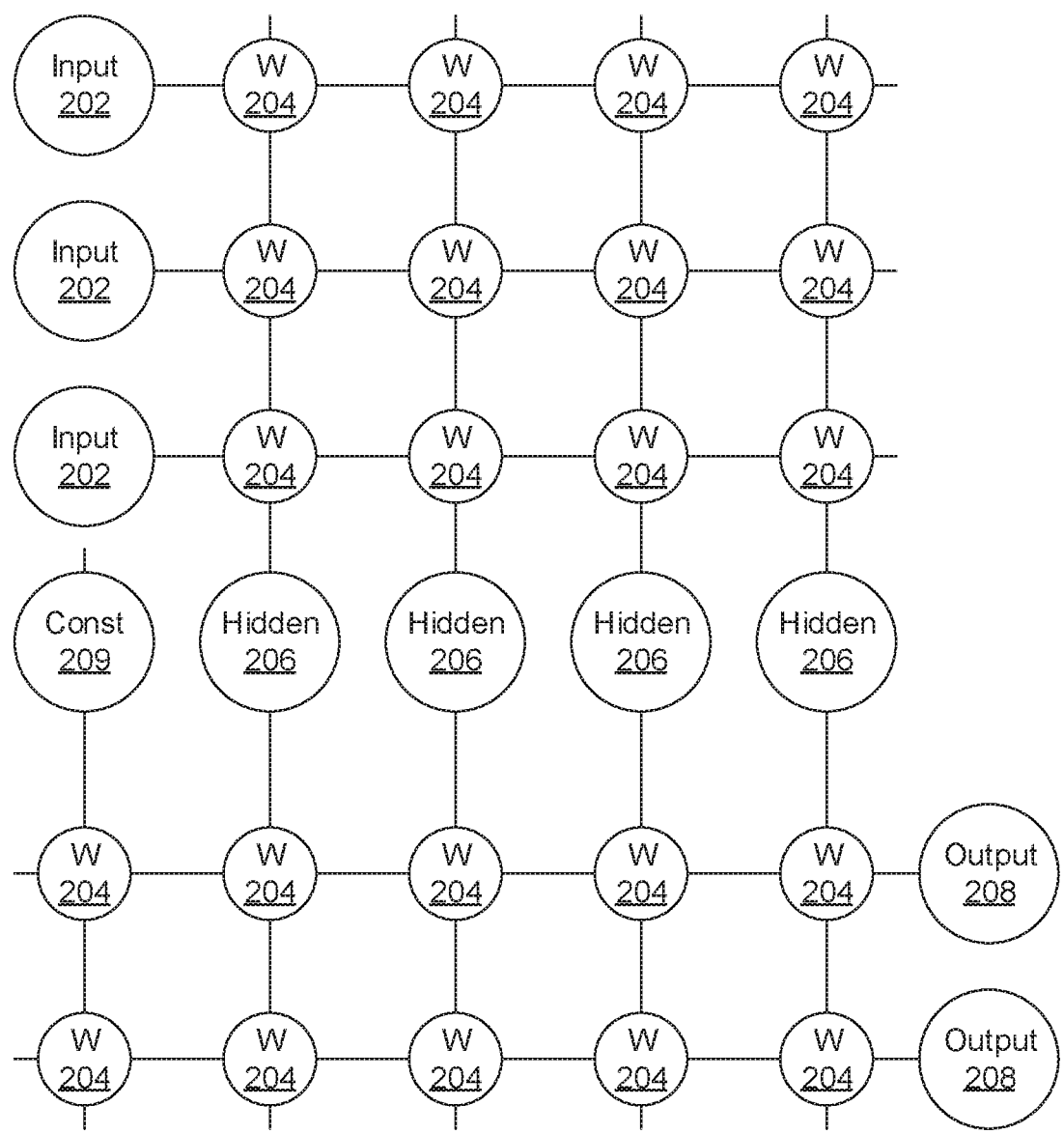
FIG. 2 is a diagram of an artificial neural network (ANN) architecture, in accordance with an embodiment of the present invention.

Referring now to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way. FIG. 2 typifies an ANN often known as a recurrent neural network.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back-propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

A recurrent neural network (RNN) is a class of artificial neural networks that can capture the temporal dependencies of sequential data and learn its representations. The RNN considers both the current data input and its hidden representation at the last time when generating the data's hidden representation at current time.

RNNs can be used to model spatio-temporal data. In brief, an RNN contains a sequence of repeated units, each of which considers both the current input and a memory state from the previous unit to output a new memory state. Using repeated units, an RNN can take an input sequence, model the spatial information from each input at each time point, and incorporate temporal information across the input sequence. RNNs that overcome the gradient vanishing/exploding problem include the Long Short-Term Memory Unit (LSTM) and Gated Recurrent Unit (GRU). These RNNs are thus able to capture long term dependencies. The example embodiments described herein can be implemented with a GRU-based RNN, which in most cases has comparable performance to LSTM RNNs, as a basic building block. Alternatively, the more complex LSTM RNNs can be used.

Figure 3:
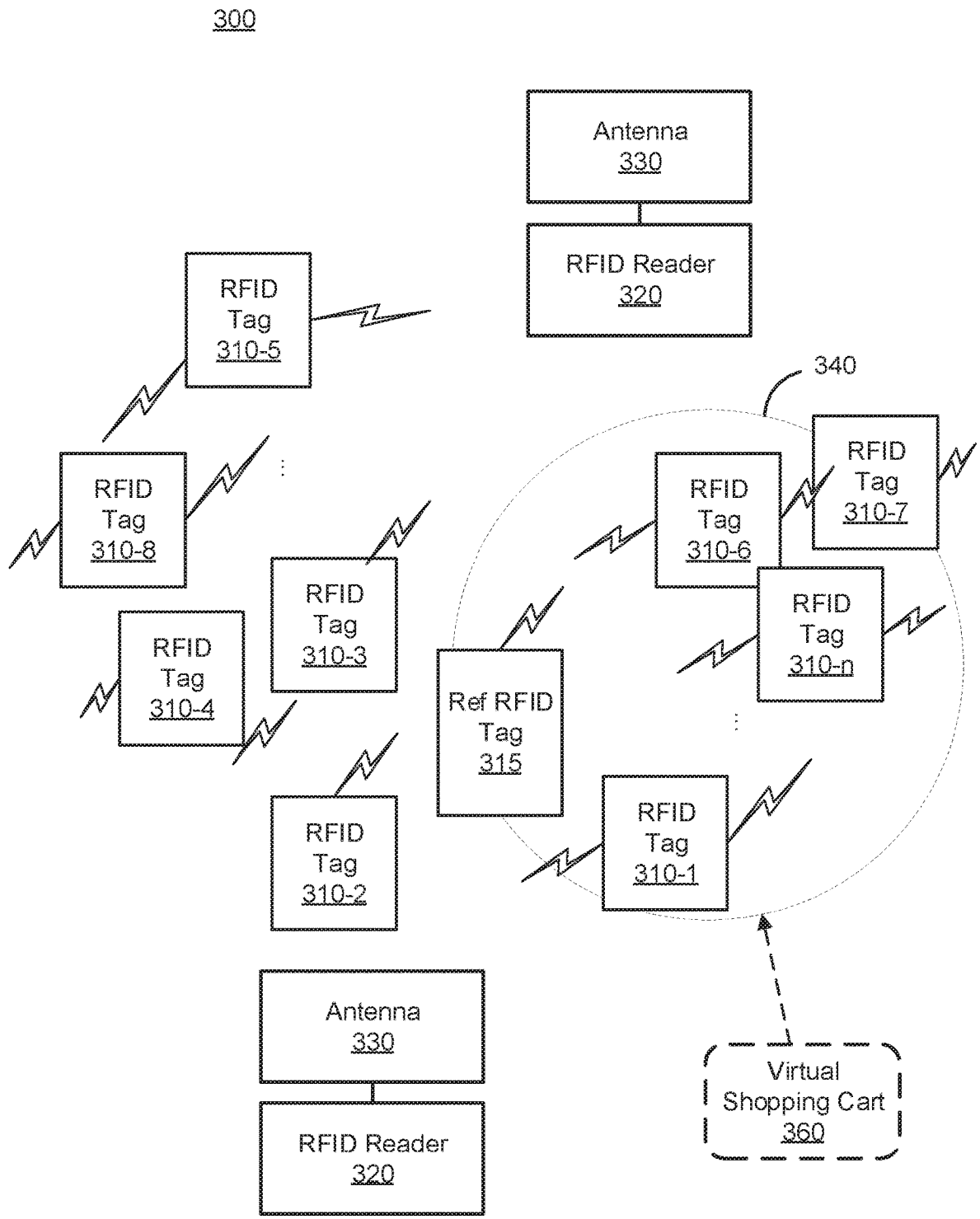
FIG. 3 is a block diagram illustrating a radio-frequency identification (RFID) reader with RFID tags, in accordance with an embodiment of the present invention.

Referring now to FIG. 3, a block diagram illustrating a RFID reader with RFID tags positioned in (for example, in a retail space), in accordance with example embodiments.

As shown in FIG. 3, multiple RFID tags 310 (shown in plurality as 310-1 to 310-n) can be positioned throughout a retail space. The system also includes reference (ref) RFID tags 315. RFID tags 310 can be read wirelessly, and do not need to be presented in a specific way to the RFID reader antenna 330. Multiple RFID tags 310 can be scanned at, substantially, the same time by having them in the checkout area at once. Simultaneous reading is from the perception of human eye as the requirement for manual scanning of items (for example, RFID tags 310) is removed (when compared to prior systems). RFID tags 310 also reduce the possibility of human error since the RFID tags 310 can be read directly without a person presenting the tag to a reader. RFID tags 110 also mark each item with a unique ID (as opposed to a common ID used for the same item type in barcodes).

RFID tags enable faster inventory and payment processing. While such implementations increase operational efficiency, the example embodiments further provide retailers with insights about customers' interactions with products. In this direction, the example embodiments identify proximity groups 340, which refer to groups of RFID tags 310 that stay near (for example, within a predetermined distance of) each other over time (for example, in a retail store).

Towards identifying proximity groups 340, the example embodiments employ deep learning to capture the spatio-temporal relationships between tag readings. Using data from RFID readers 320 distributed in a retail store, the example embodiments can identify (for example, hidden) purchase behaviors of customers by tracking the evolution of their "virtual shopping carts" 360 (for example, displayed on a graphical user interface of a consumer and/or store device based on a reference RFID tag 315) as they pick up (or put back) products throughout their shopping journey. The example embodiments can help increase sales by helping the retailers discover popular purchase paths (and deviations from the paths). In addition, the example embodiments enable seamless checkout where the customer can be billed without stopping at a checkout station at all since the purchases would be tracked automatically as part of the shopping process.

The example embodiments can identify proximity groups 340 from hundreds (or thousands) of RFID tags 310 moving in random patterns in a dynamic environment. The example embodiments leverage RNNs to stitch together a history of tag readings from multiple readers 320 for accurate identification of proximity groups 340, without having to explicitly localize the RFID tags 310. The example embodiments can enable retail applications by continuously tracking groups of tags with common mobility patterns.

According to example embodiments, the system implements a framework that employs a twin (alternatively referred to as Siamese) RNN model for learning the spatio-temporal proximity between RFID tags 310. The twin RNN model can be implemented to only rely on tag data from commercial RFID equipment and to group both stationary and mobile RFID tags 310 with very high accuracy.

The example embodiments can adjust for multipath and blockage inherent in wireless systems, which together cause sporadic and noisy tag readings. The example embodiments can leverage attention mechanisms from natural language processing (NLP) systems to ensure that reliable readings are emphasized while filtering out noisy reports that can reduce the grouping accuracy.

An ultra-high frequency (UHF) RFID system includes readers 320, RFID tags 310 attached to objects and software to collect/process the tag readings. Each RFID reader 320 emits a signal that is backscattered by recipient tags to generate a response (containing their unique tag ID). In addition to RFID tag data, RFID readers 320 extract the received signal strength indicator (RSSI) from the response. Some sophisticated RFID readers capture other features such as phase difference or Doppler shift. Each RFID reader 320 can be equipped with multiple antennas, cycling through the antennas 330 by transmitting and waiting for RFID tag responses on one antenna before moving to the next one, until all antennas 330 are given a chance to read the RFID tags 310. The example embodiments can be implemented to track RFID tags 310 in a large retail store, and multiple RFID readers 320 can be placed to allow some overlap between them to eliminate any coverage gaps.

The example embodiments can be implemented to identify multiple RFID tag groups 340 where an RFID tag group 340 is defined as the set of RFID tags 310 that stay in close (for example, within a predetermined maximum distance) proximity to each other, over time. The system defines mobile RFID tag groups 340, which represent RFID tags 310 moving together (for example, in the store). The mobile RFID tag groups 340 can be stationary at certain times but still maintain (the predetermined) proximity all the time. The system also defines static RFID tag groups 340, which represent the set of tags located near each other (without moving). The RFID tag groups 340 can change (for example, evolve) due to different shopping actions. For example, when a customer takes an item from the shelf and walks away with it, that item is no longer in the same RFID tag group 340 as other items on the shelf and must be included in RFID tag group 340 together with other items the customer may be carrying.

Examples of the systems described herein have been implemented with commercial RFID equipment and evaluated in detail. Experiments show that the example implementations have achieved a grouping accuracy of 98.18% (99.79%) when tracking eight mobile (stationary) groups, while adapting to the dynamic changes in an environment.

Figure 4:
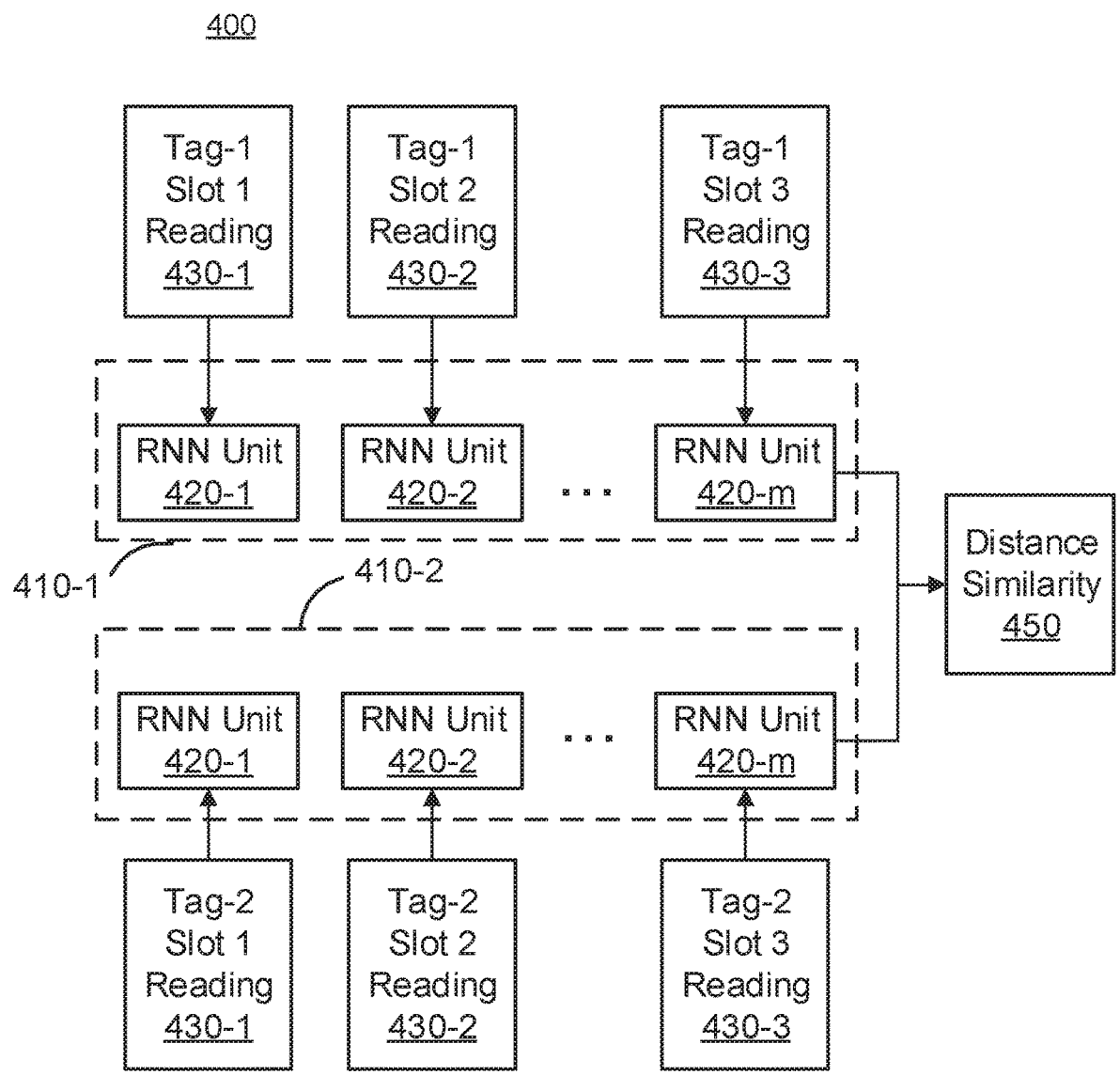
FIG. 4 is a block diagram illustrating a system including a twin recurrent neural network (RNN) architecture, in accordance with the present invention.

Referring now to FIG. 4, a block diagram 400 illustrating a high-level system 400 including a twin recurrent neural network (RNN) architecture, in accordance with example embodiments.

As shown in FIG. 4, the example embodiments implement a twin neural network (NN) architecture for learning the similarity between a pair of RFID tags 310. The twin NN has two identical sub-networks 410 (shown as 410-1 and 410-2) with the same configuration where each sub-network 410 takes one of the inputs and maps the input to an embedding space. The subnetworks contain RNN units 420 (illustrated as RNN unit 420-1 to 420-$m$). Readings 430 from each of the paired RFID tags 310 within each time slot are input to the RNN units 420.

According to an example embodiment, a decision window is defined as the interval in which a single estimation is made as to whether a given pair of RFID tags 310 are in (a predetermined) proximity. More formally, the system can represent each reading 430 (shown as tag (time) slot (k) reading 430-($k$), with k representing a variable number of the time slot) as a vector $r_i \in \mathcal{R}^{d_1}$. $r_i$ includes features such as timestamp, received signal strength indicator (RSSI), etc. All RFID readings 430 for an RFID tag 310 in a decision window can be represented as $x=[r_1, r_2, \ldots, r_N]$, $x \in \mathcal{R}^{N \times d_1}$, where N is the number of RFID readings 430 within the decision window, which can vary across RFID tags 310 and decision windows. Given the readings 430 for a pair of RFID tags 310, say $x_1$ and $x_2$, the system employs an RNN to learn an embedding function $f(\cdot)$ that maps the RFID readings 430 to a feature vector. The system can operate based on a postulate that the embedded feature vectors for the two tags viz., $f(x_1)$ and $f(x_2)$, will be close if the RFID tags 310 were within a pre-specified spatial proximity during the particular decision window, and far from each other otherwise. The system can use a small decision window to help capture proximity changes quickly. However, the decision window must be determined to be large enough (for example, not too small) to capture enough RFID readings 430 to have a reliable estimation.

The example embodiments are designed to account for a diverse number of RFID readings 430. The deep-learning model described is applicable to RFID systems, in which the number of readings across RFID tags 310 may widely vary from tens to thousands in each decision window. A key factor that influences this is the total number of RFID tags 310 and their respective wireless channels in the coverage area of the RFID reader 320. Design considerations are selected between provisioning the RNN to deal with the highest number of RFID readings 430 results that can lead to high model complexity (due to large input vectors) and designing the RNN for RFID tags 310 with few RFID readings 430 that can yield a model with insufficient "capacity" to identify the RFID tag groups 340.

The example embodiments are also designed to account for noisy RFID tag readings 430. Multipath results in a plurality of signals from each RFID tag 310 (with varying RSSIs and phases) even if the RFID tag 310 is at a fixed location. The example embodiments are applicable in retail settings with tag mobility and are capable of using fewer RFID readings 430 (for example, in contrast to solutions that collect readings over time and localize tags at a given position) with regards to each position, and determining which RFID readings 430 reliably represent a given position. Thus, the example embodiments can be implemented with a small number of unreliable RFID readings 430 from each position to accurately discover mobile RFID tag groups 340.

The example embodiments are also designed to account for diverse mobility patterns. For example, a retail store can have both stationary RFID tags 310 (e.g., on shelves) and mobile RFID tags 310 (e.g., carried by people). The RNNs can be configured to work with data that applies to both stationary and mobile RFID tags 310 and is available with all commercial off-the-shelf (COTS) RFID equipment. In some instances, Doppler shift could help distinguish across mobile RFID tag groups 340 since Doppler shift can indicate speed and direction of movement. However, Doppler shift is not significant for static RFID tag groups 340 since the lack of movement does not induce sufficient Doppler shift. Phase difference can be used to identify stationary groups since phase difference can estimate the RFID tag's 310 distance from the RFID reader 320. On the other hand, it can be very difficult to obtain a reliable phase estimate for mobile RFID tags 310. Further, such low-level signal features are not available in all COTS RFID readers. The example embodiments can be implemented without use of Doppler shift and/or phase difference.

According to example embodiments, the system can be implemented using pairwise proximity for grouping. For example, towards identifying an RFID tag group 340, the system uses pairwise proximity (e.g., proximity between two RFID tags 310) as a primitive. The system can be implemented with "reference" RFID tags 315 that initially are the only member in their respective RFID tag groups 340. These special ref RFID tags 315 can be installed on shopping carts or bags as well as on shelves. Other RFID tags 310 (non-reference) are tested for membership in an RFID tag group 340 by comparing their "similarity" with the reference tag of that group. Higher similarity means that the two tags are more likely to be in close proximity. Hence, each RFID tag 310 gets added to the RFID tag group 340 with the highest similarity.

As described above, the twin neural network has two identical sub-networks 410 with the same configuration where each sub-network 410 takes one of the inputs and maps the input to an embedding space. The embedded feature outputs from the two sub-networks is then fed to a module where measures such as the L2 norm distance between two embedded outputs are used to find the similarity (distance similarity 450).

To train the twin neural network towards learning the embedding function $f(\cdot)$, the system uses a modified contrastive loss function that includes both a lower margin ($m_1$) and an upper margin ($m_2$) as $$\text{Loss}(x_1, x_2, y) = \frac{1}{2} y \max(0, \|f(x_1) - f(x_2)\|_2 - m_1)^2 + \frac{1}{2}(1-y)\max(0, m_2 - \|f(x_1) - f(x_2)\|_2)^2 \quad \text{Eqn. (1)}.$$

where $x_1$ and $x_2$ form the pair of reading attributes from two RFID tags 310. $x_1$ and $x_2$ can include some form of a feature or attribute extracted from readings such as signal strength, phase, or the number of readings in a particular antenna port, etc. The boolean label y is equal to '1' where the RFID readings 430 belong to two RFID tags 310 from the same proximity group 340 and '0' otherwise. Specifically, the system introduces a lower margin $m_1$ to ensure that RFID tags 310 that are nearby (as opposed to at the exact same coordinates) are grouped together.

The example embodiments of the ANN (described with respect to FIGS. 1 and 2) can be used to implement a twin RNN (referred to as the model) with a large set of input pairs and their ground-truth labels. For example, true (y=1) where the pair of RFID readings 430 come from two RFID tags 310 in the same RFID tag group 340 and false (y=0) otherwise. To find the optimal $f(\cdot)$, the model minimizes the above loss function (Eqn. 1) to classify two RFID tags 310 being in the same RFID tag group 340 (distance<$m_1$) or not (distance>$m_2$). The parameters of the two subnetworks are updated by back-propagation using the gradient to minimize the loss over all training pairs. The margins are determined empirically. After training, the example embodiments can test the similarity between pairs of RFID tags 310 (for example, with one being a reference tag) in order to form the RFID tag groups 340.

Figure 5:
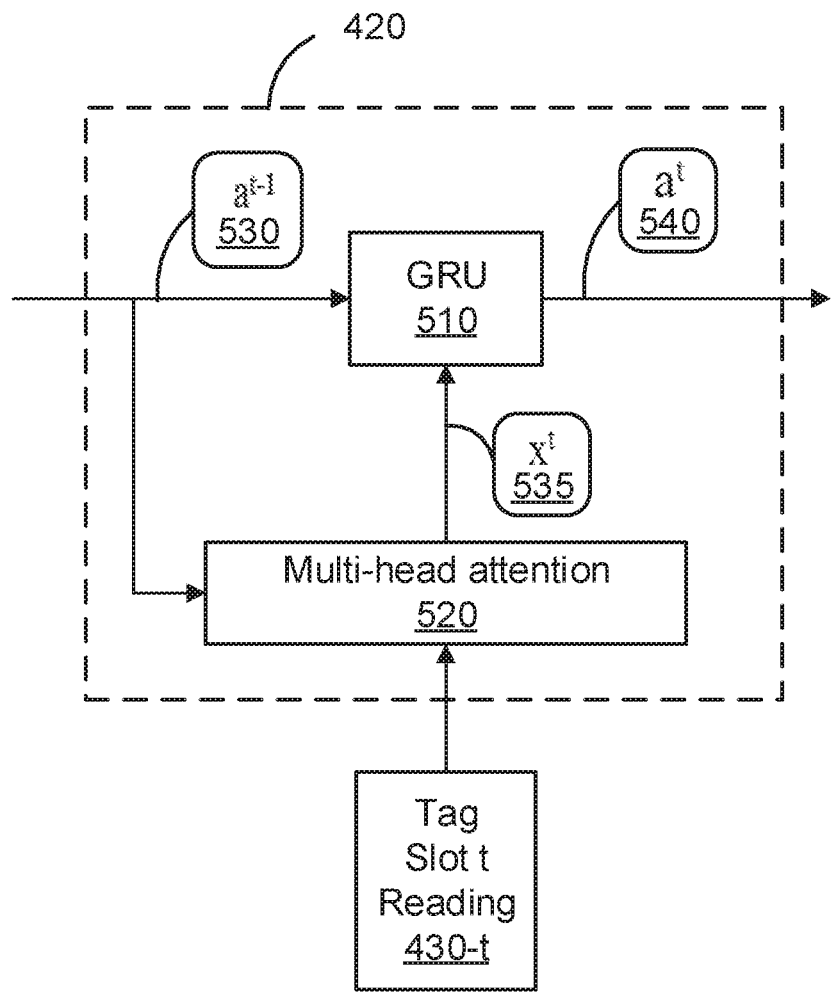
FIG. 5 is a block diagram illustrating a summarization process using multi-head attention in each RNN unit, in accordance with an embodiment of the present invention.

Referring now to FIG. 5, a block diagram 300 illustrating summarization process using multi-head attention in each RNN unit, in accordance with example embodiments.

As shown in FIG. 5, a summarization process is implemented using multi-head attention 510 in each RNN unit 420. The RNN units 420 include a GRU 510. The summarization of readings within the current time slot is guided by the current trajectory memory $a^{t-1}$ (530) accumulated by the RNN.

The example embodiments use attention mechanism to summarize tag reading. Before feeding the tag readings 430 as input to twin RNNs, the system first divides the decision window into multiple (say T) time slots. The time slot is selected with a sufficiently short duration such that RFID tags 310 are assumed to be quasi-stationary during this time (e.g., 1-2 seconds). Further, the system applies attention as a preprocessing step to summarize the readings 430 in each time slot. These summaries form the inputs to the model (the twin RNNs) and are represented by $x_t^{(j)}$ and $x_t^{(k)}$ for time slot t and for tags j and k.

Attention mechanism is applied to grouping RFID tags 310 based on a postulate that some of the RFID readings 430 from an RFID tag 310 may be "more informative" (e.g., not much affected by multipath or drastic attenuation) while other RFID readings 430 have little information with respect to the current state. The system uses the memory the model has accumulated so far ($a^{t-1}$) (530) to guide the summarization of the readings in the current time slot ($a^t$) (540). By comparing the memory state (which contains the current trajectory information for the RFID tag 310) with each RFID reading 430 within the time slot, the attention mechanism calculates which RFID readings 430 are more trustworthy in terms of the RFID tag's 310 state (location, motion, etc.). The attention mechanism thereby gives more weight (forces more attention) on the more informative readings during summarization.

An issue that can arise is that each RFID reading 430 may be informative with respect to different aspects (e.g., an RFID reading 430 may have similar RSSI but may come from a previously unseen antenna). Thus, the system applies multi-head attention mechanisms 520, which allow the system to perform feature summarization in multiple subspaces (one head corresponds to one subspace) and compare the informative extent within each subspace. The system denotes the RFID readings 430 from the current time slot as $R^t = [r_1^t, r_2^t, \ldots, r_N^t] \in \mathcal{R}^{N \times d_1}$. N is the number of RFID readings 430 within the current time slot and $\alpha^{t-1} \in \mathcal{R}d2$ is the memory from the last RNN unit 420. For ease of exposition, the following discussion considers RFID readings 430 relating to a single RFID tag 310 and does not show the indices t or t–1 in the following.

The system linearly projects a and each r to a d-dimension space as shown below. $W_\alpha$ and $W_r$ are the projection matrix to be learned as shown in Eqns. (2) and (3).

$$RW_r \in \mathcal{R}^{N \times d}, W_r \in \mathcal{R}^{d_1 \times d} \quad (2)$$

$$\alpha W_\alpha \in \mathcal{R}^d, W_\alpha \in \mathcal{R}^{d_2 \times d} \quad (3)$$

The system partitions the projected memory vector and the projected reading vectors evenly into H parts. The system thereby generates H memory vectors in H representative subspaces. A similar approach is taken for each reading vector, and the subfeatures of each reading vector are mapped into these subspaces. To formalize, within the hth subspace, the system gets one memory vector $\alpha^{(h)} \in \mathcal{R}^{d_H}$ and N tag reading vectors $$R^{(h)} \in \mathcal{R}^{N \times d_n}, d_H = \frac{d}{H}.$$

Within each subspace, the system measures the relativity (attention) between the memory vector $\alpha^{(h)}$ and all the reading vectors $r_i^{(h)}$ by computing the dot products between the memory vector and each reading vector. This yields a vector of N dimensions, where each element represents the relative score for each reading. The system divides each element by $\sqrt{(d_H)}$ (to normalize), and then applies a softmax function on the vector to obtain the final attentions on each reading vector. The summarized feature for all the RFID readings 430 within this subspace is then the weighted sum of all the reading vectors as shown in Eqn. (4). Note that the summarized vector is of dimensionality $d_H$.

$$f_{SingleHead}(a^{(h)}, R^{(h)}) = \text{softmax}\left(\frac{a^{(h)} R^{(h)T}}{\sqrt{d_H}}\right) R^{(h)} \quad (4)$$

The system concatenates the summarized vector from each subspace and gets the final summarized vector as shown in Eqn. (5).

$$f_{MultiHead}(\alpha, R) = [f_{SingleHead}(\alpha^{(1)}, R^{(1)}), \ldots, f_{SingleHead}(\alpha^{(H)}, R^{(H)})] \quad (5)$$

The summarized sub-features in a summarized vector are separated. To combine them, the system invokes a linear transformation on the summarized feature vector as shown in Eqn. (6) and then feeds the transformed feature into the GRU model 510 as the input as shown in FIG. 5 (x$^t$ (535)).

$$x^t = f_{MultiHead}(\alpha^t, R^t) W_m \quad (6)$$

During training, the parameters of the attention mechanism that are to be learnt are the projection matrices $W_\alpha$, $W_r$ and $W_m$. Given the input pairs and their ground-truth labels, the system can apply the gradient descent method to update $W_\alpha$, $W_r$ and $W_m$. After training the system determines a) $W_\alpha$ that projects the last memory state to the proper subspaces so that in each subspace, the dot-product value between the memory state and the reading vector would capture the reading's informative extent relative to that subspace. b) $W_r$ that projects the tag reading vectors to proper subspaces by using dot-products where the readings are informative (as in (a)); and c) $W_m$ that merges the information from the different subspaces and represent the summary in a way that forms suitable input to the RNN.

Figure 6:
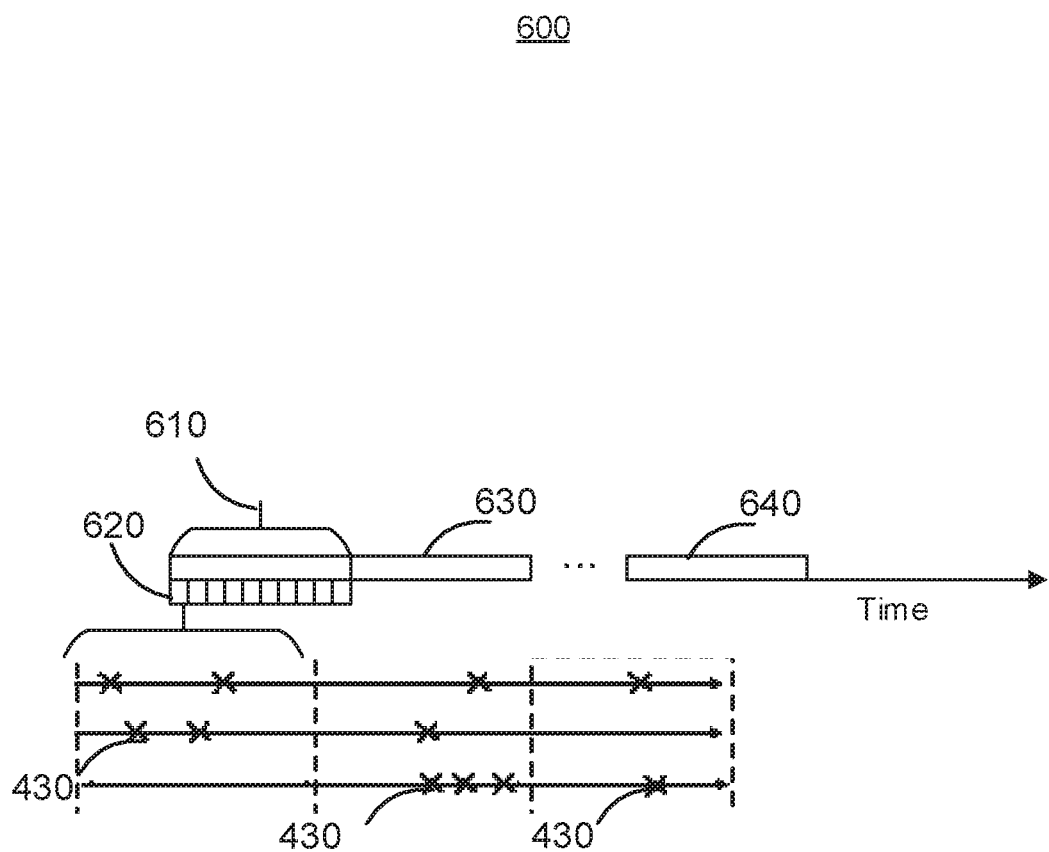
FIG. 6 is a block diagram illustrating readings within a decision window divided into multiple time slots, in accordance with an embodiment of the present invention.

Referring now to FIG. 6, a block diagram 300 illustrating readings within one decision window, in accordance with example embodiments.

As shown in FIG. 6, the system can select to split a decision window 610 into multiple time slots 620 specifically to deal with diverse numbers of RFID readings 430 across RFID tags 310. With this design, the sequence length of the RNN (e.g., number of repeating units 420, as shown with respect to FIG. 4) is equal to the number of time slots 620 (T) within the decision window. This allows the system to control the model complexity with T rather than the number of readings within the decision window 610. As mentioned before, one may observe thousands of RFID readings 430 from some RFID tags 310 in a decision window 610, which introduces tremendous complexity. The system can determine items that belong 630 to a consumer and items that do not belong to a consumer 640 based on the decision window 610.

According to example embodiments, the system applies the multi-head attention mechanism 520 specifically to handle noisy tag readings. Due to multi-path, the responses from an RFID tag 310 may have considerable fluctuations in RSSI (or phase) even if the RFID tag 310 is at a fixed location. The multi-head attention mechanism 520 recognizes a set of responses that best describe the mobility state of the RFID tag 310 and uses these signals for inference. The multi-head attention mechanism 520 is applied based on a postulate that the location for a mobile tag changes somewhat slowly within the time slot (since typical human shopping speed is limited) and therefore the reliable signals tend to evolve gradually with time. The multi-head attention mechanism 520 compares previous trajectory information with the new RFID readings 430 and chooses the trustworthy new RFID readings 430 that are consistent with the memory. Outlier RFID readings 430 that yield considerably different features from what is in memory are considered less trustworthy.

In addressing diverse mobility patterns, the example embodiments can exclude Doppler shift or phase as a feature in the model although the RFID readers 320 often expose this information. As described herein above, Doppler shift is not of significance for stationary tags and phase measurement is not reliable for mobile tags. Further, obtaining these features in practical settings with multiple interfering RFID readers 320 is challenging. Instead, the system uses two attributes for each RFID reading: RSSI and antenna port ID. The antenna port ID indicates the particular antenna (or physical beam) of a particular RFID reader 320 that read the RFID tag 310. For consistency between RFID readings 430, the system can normalize the RSSI in the range [−1, 1]. Antenna port ID is a discrete attribute and is denoted by a one-hot vector.

According to an embodiment, the system uses batch gradient descent to train the model. At each step, the system feeds a batch of input pairs to the model corresponding to the readings 430 of two RFID tags 310 within a decision window. The pair label is true if the two RFID tags 310 are from the same box (false otherwise). Given the labels, the system performs back-propagation and gets the gradients for each parameter towards minimizing the contrastive loss over the input batch. The system then updates the parameters based on their gradients, for example, by implementing $$w_i^{(t)} = w_i^{(t-1)} - \alpha \frac{\partial \text{Loss}}{\partial w_i},$$

where $\alpha$ is the learning rate. In an example implementation, the system uses a predetermined number of (for example, 100,000) training steps with a predetermined batch size (for example, of 256). Values can be empirically chosen. For example, a start learning rate is 0.0005; and an exponential decay on the learning rate with a decay step of 20, and decay rate of 0.99.

During training, there is a high probability (for example, chance) that a randomly selected tag pair will have a false label. Since the system minimizes the loss over all the training samples, if the ground truth for the majority of them is false, the model is trained to favor false outputs and will not able to learn true relationships. The system overcomes this by constraining half of the samples to have true labels and the other half to have false labels at each training step. Even after the system balance the samples, the number of false pairs belonging to two nearby groups is much less than the number of false pairs belonging to far away groups. However, the pairs from the two nearby groups are more important because it is harder to distinguish such pairs from true pairs. To help the model identify false pairs from nearby groups, the system implements a strategy of "training on hard samples repeatedly." At each training step, the system keeps the hard samples that give large loss and uses them in the next batch for the next training step. To avoid overfitting to outlier samples, the system first chooses a top percentage (for example, the top 10%) of such hard samples and randomly chooses a portion (for example, half) of these to be included in the next training batch.

Figure 7:
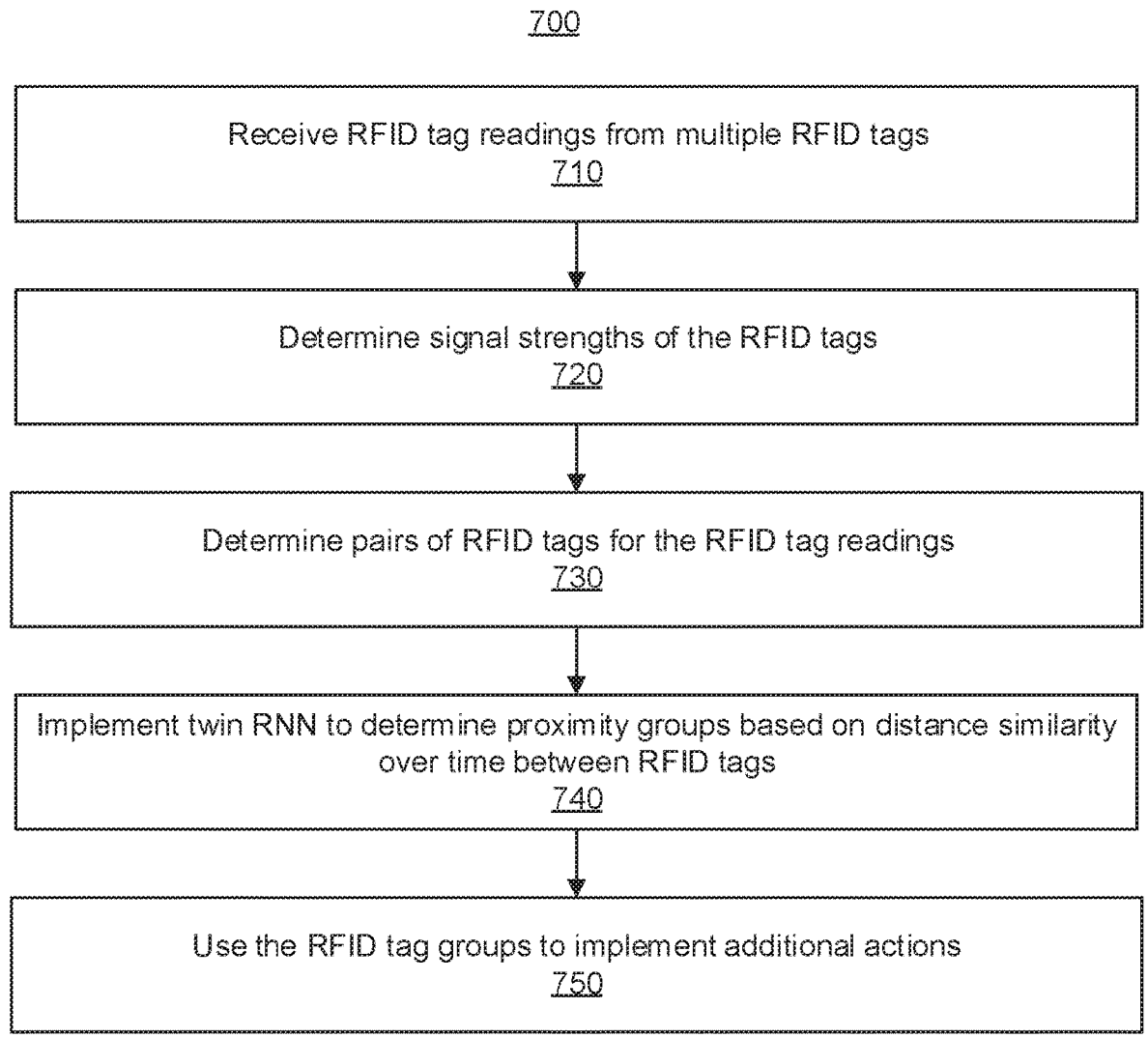
FIG. 7 is a flow diagram illustrating a method of grouping RFID tags based on spatio-temporal proximity, in accordance with the present invention.

FIG. 7 is a flow diagram illustrating a system/method 700 for grouping RFID tags based on spatio-temporal proximity, in accordance with the present invention.

At block 710, the system 400 receives RFID tag readings 430 from multiple RFID tags 310. The RFID tag readings 430 can include tag data for each RFID tag 310.

At block 720, the system 400 determines signal strengths of the RFID tag readings 430 from the multiple RFID tags 310. For example, the readers 320 can extract RSSI information.

At block 730, system 400 determines pairs of RFID tags 310 for the RFID tag readings 430. The RFID tag 310 pairs can be determined using pairwise proximity and tested for membership in a group by similarity to a reference RFID tag 315 (from which to generate an RFID tag group 340).

At block 740, system 400 implements a twin RNN (for example, as shown and described with respect to FIG. 4) to determine proximity groups based on distance similarity over time between RFID tags 310 (using the pairs of RFID tag readings 430). The system 400 defines mobile groups, which represent RFID tags 310 moving together in the store and static groups, which represent the set of RFID tags 310 located near each other (without moving).

At block 750, the system 400 uses the RFID tag groups 340 to implement additional actions. For example, determine hidden purchase behaviors of the consumers, popular purchase paths (for example, based on schematics of the shopping venue), and ongoing billing of the consumer throughout the shopping experience (for example, via an associated graphical user interface of a consumer device).

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for determining radio-frequency identification (RFID) tag proximity groups, comprising:
    receiving RFID tag readings from a plurality of RFID tags;
    determining signal strengths of the RFID tag readings;
    determining pairs of RFID tags based on the RFID tag readings;
    implementing a twin recurrent neural network (RNN) to determine at least one proximity group of RFID tags based on distance similarity over time between each of the pairs of the RFID tags; and
    applying an attention mechanism to compare previous trajectory information with new readings and choose trustworthy new readings that are consistent with the previous trajectory information.

2. The method as recited in claim 1, further comprising:
    before feeding the RFID tag readings as input to the twin RNN, dividing a decision window into multiple time slots, wherein each of the multiple time slots has a duration such that each of the plurality of RFID tags is defined as quasi-stationary.

3. The method as recited in claim 1, further comprising:
    applying an attention mechanism to summarize the RFID readings in each time slot to ensure that reliable readings are emphasized while filtering out noisy reports.

4. The method as recited in claim 1, further comprising:
    determining the distance similarity over time based on a reference tag.

5. The method as recited in claim 1, further comprising:
    training the twin RNN towards learning an embedding function $f$ based on a contrastive loss function including both a lower margin ($m_1$) and an upper margin ($m_2$)

$$\text{Loss}(x_1, x_2, y) = \frac{1}{2} y \max(0, \|f(x_1) - f(x_2)\|_2 - m_1)^2 +$$

$$\frac{1}{2}(1-y)\max(0, m_2 - \|f(x_1) - f(x_2)\|_2)^2$$

where $x_1$ and $x_2$ form a pair of the RFID tag reading attributes from two tags and y is a Boolean label indicative of whether the two tags are in a same proximity group.

6. The method as recited in claim 5, further comprising:
    determining an input for the twin RNN based on a linear transformation of a transformed feature $x^t = f_{MultiHead}(\alpha^t, R^t)W_m$
    wherein t represents a current time, a represents a trajectory, R represents readings from a time slot and $W_m$ represents a projection matrix.

7. The method as recited in claim 1, further comprising:
    determining the at least one proximity group to include groups of stationary tags and groups of mobile tags.

8. The method as recited in claim 1, further comprising:
    receiving the RFID tag readings from multiple RFID readers placed to allow overlap to eliminate coverage gaps.

9. The method as recited in claim 1, further comprising:
    applying a decision window as an interval in which a proximity between at least one pair of RFID tags is estimated based on a feature vector that includes at least one reading attribute selected from a group including a timestamp, a phase, a Doppler shift and a received signal strength.

10. The method as recited in claim 1, further comprising:
    using the at least one proximity group of RFID tags to determine at least one of:
        hidden purchase behaviors of consumers,
        popular purchase paths the consumers, and
        ongoing billing of the consumers.

11. A computer system for determining radio-frequency identification (RFID) tag proximity groups, comprising:
    a processor device operatively coupled to a memory device, the processor device being configured to:
    receive RFID tag readings from a plurality of RFID tags;
    determine signal strengths of the RFID tag readings;
    determine pairs of RFID tags based on the RFID tag readings;
    implement a twin recurrent neural network (RNN) to determine at least one proximity group of RFID tags based on distance similarity over time between each of the pairs of the RFID tags; and
    apply an attention mechanism to compare previous trajectory information with new readings and choose trustworthy new readings that are consistent with the previous trajectory information.

12. The system as recited in claim 11, wherein the processor device is further configured to:
    before feeding the RFID tag readings as input to the twin RNN, divide a decision window into multiple time slots, wherein each of the multiple time slots has a duration such that each of the plurality of RFID tags is defined as quasi-stationary.

13. The system as recited in claim 11, wherein the processor device is further configured to:
    apply an attention mechanism to summarize the RFID readings in each time slot to ensure that reliable readings are emphasized while filtering out noisy reports.

14. The system as recited in claim 11, wherein the processor device is further configured to:
    determine the distance similarity over time based on a reference tag.

15. The system as recited in claim 11, wherein the processor device is further configured to:
train the twin RNN towards learning an embedding function $f$ based on a contrastive loss function including both a lower margin ($m_1$) and an upper margin ($m_2$)

$$\text{Loss}(x_1, x_2, y) = \frac{1}{2} y \max(0, \|f(x_1) - f(x_2)\|_2 - m_1)^2 + \frac{1}{2}(1 - y)\max(0, m_2 - \|f(x_1) - f(x_2)\|_2)^2$$

where $x_1$ and $x_2$ form a pair of the RFID tag reading attributes from two tags and y is a Boolean label indicative of whether the two tags are in a same proximity group.

16. The system as recited in claim 15, wherein the processor device is further configured to:
determine an input for the twin RNN based on a linear transformation of a transformed feature $x^t = f_{MultiHead}(\alpha^t, R^t)W_m$
wherein t represents a current time, a represents a trajectory, R represents readings from a time slot and $W_m$ represents a projection matrix.

17. The system as recited in claim 11, wherein the processor device is further configured to:
determine the at least one proximity group to include groups of stationary tags and groups of mobile tags.

18. A computer program product for determining radio-frequency identification (RFID) tag proximity groups, the computer program product comprising a non-transitory computer readable storage medium having program instructions embodied therewith, the program instructions executable by a computing device to cause the computing device to perform the method comprising:
receiving RFID tag readings from a plurality of RFID tags;
determining signal strengths of the RFID tag readings;
determining pairs of RFID tags based on the RFID tag readings;
implementing a twin recurrent neural network (RNN) to determine at least one proximity group of RFID tags based on distance similarity over time between each of the pairs of the RFID tags; and
applying an attention mechanism to compare previous trajectory information with new readings and choose trustworthy new readings that are consistent with the previous trajectory information.

* * * * *